US012645946B2

(12) United States Patent
Zhang et al.

(10) Patent No.: US 12,645,946 B2
(45) Date of Patent: Jun. 2, 2026

(54) TRANSFER REINFORCEMENT LEARNING METHOD AND APPARATUS, AND MULTI-TASK REINFORCEMENT LEARNING METHOD AND APPARATUS

(71) Applicant: Horizon Robotics Inc., Cupertino, CA (US)

(72) Inventors: Haichao Zhang, Cupertino, CA (US); Lingfeng Sun, Cupertino, CA (US); Wei Xu, Cupertino, CA (US)

(73) Assignee: Horizon Robotics Inc., Cupertino, CA (US)

( * ) Notice: Subject to any disclaimer, the term of this patent is extended or adjusted under 35 U.S.C. 154(b) by 573 days.

(21) Appl. No.: 18/309,101

(22) Filed: Apr. 28, 2023

(65) Prior Publication Data

US 2024/0362491 A1      Oct. 31, 2024

(51) Int. Cl.
*G06N 3/092* (2023.01)

(52) U.S. Cl.
CPC .................................... *G06N 3/092* (2023.01)

(58) Field of Classification Search
CPC ......... G06N 3/092; G06N 3/096; G06N 20/00
See application file for complete search history.

(56) References Cited

U.S. PATENT DOCUMENTS

2023/0347510 A1* 11/2023 Zhang ...................... G06N 3/00

FOREIGN PATENT DOCUMENTS

| | | | | | |
|---|---|---|---|---|---|
| CN | 116866351 A | * | 10/2023 | ......... | H04L 67/1008 |
| CN | 115796025 B | * | 1/2025 | ........... | G06N 3/0895 |
| KR | 102846352 B1 | * | 8/2025 | ............. | G06N 3/045 |
| WO | WO-2023101112 A1 | * | 6/2023 | ............... | G06N 3/00 |

OTHER PUBLICATIONS

Extended European Search Report from corresponding European Patent Application No. 24171257.9, mailed on Sep. 30, 2024.
Lingfeng, Sun et al., "Paco: Parameter-Compositional Multi-Task Reinforcement Learning", 36th Conference on Neural Information Processing Systems (NeurIPS), arxiv.org, Oct. 21, 2022.
D'Eramo, Carlo et al., "Sharing Knowledge in Multi-Task Deep Reinforcement Learning", Apr. 27, 2020.
Vithayathil, Varghese Nelson et al., "A Survey of Multi-Task Deep Reinforcement Learning", Electronics, vol. 9, No. 9, Aug. 22, 2020, p. 1363.

* cited by examiner

*Primary Examiner* — Maher N Algibhah
(74) *Attorney, Agent, or Firm* — K&L Gates LLP

(57) ABSTRACT

Disclosed in the present disclosure are a transfer reinforcement learning method and apparatus, multi-task reinforcement learning method and apparatus, relating to the field of intelligent control technology. The transfer reinforcement learning method includes determining operational instructions for instructing an agent to perform a first task; determining an inclusion relation between multiple second tasks and the first tasks based on the operational instructions; determining a shared parameter set corresponding to the multiple second tasks based on the inclusion relation between the multiple second tasks and the first task, wherein the shared parameter set includes a plurality of parameters shared by the multiple second tasks; and performing transfer reinforcement learning based on the shared parameter set and the first task to obtain model parameters of a target policy model corresponding to the first task.

10 Claims, 11 Drawing Sheets

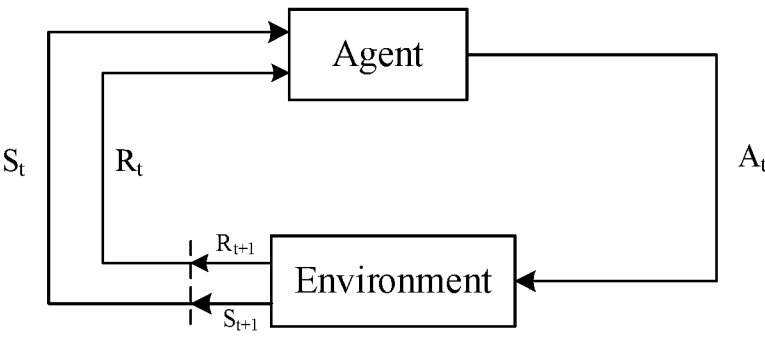

FIG. 1

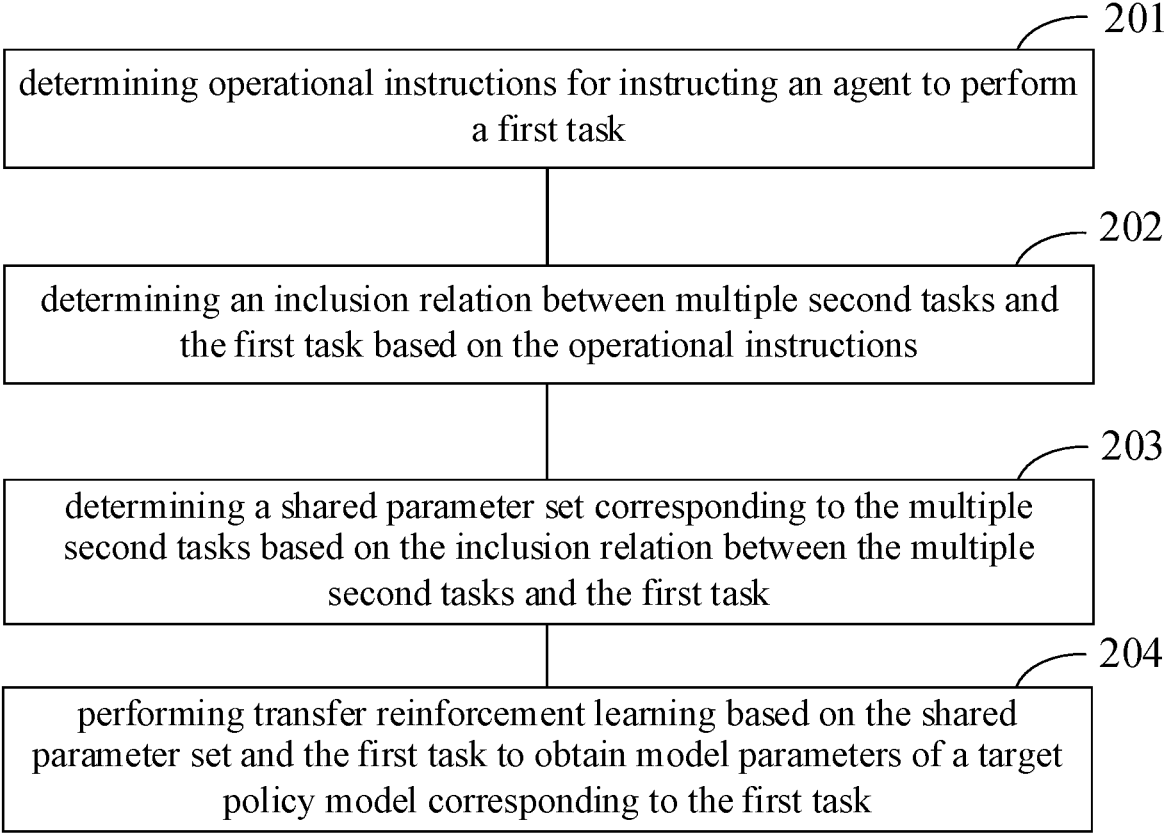

201 determining operational instructions for instructing an agent to perform a first task

202 determining an inclusion relation between multiple second tasks and the first task based on the operational instructions

203 determining a shared parameter set corresponding to the multiple second tasks based on the inclusion relation between the multiple second tasks and the first task

204 performing transfer reinforcement learning based on the shared parameter set and the first task to obtain model parameters of a target policy model corresponding to the first task

FIG. 2

601 acquiring a data information set generated during performing of each of the multiple second tasks

602 performing multi-task reinforcement learning based on the data information set of each of the second tasks to obtain a shared parameter set and parameter compositional vectors in a target multi-task policy model

TRANSFER REINFORCEMENT LEARNING METHOD AND APPARATUS, AND MULTI-TASK REINFORCEMENT LEARNING METHOD AND APPARATUS

FIELD OF THE INVENTION

The present disclosure relates to a field of intelligent control technology, and in particular to a transfer reinforcement learning method and apparatus, and a multi-task reinforcement learning method and apparatus.

BACKGROUND OF THE INVENTION

At present, Reinforcement Learning (RL) is widely used in various scenarios in artificial agent to solve complex tasks in different scenarios. For example, robots may use RL to perform a variety of similar tasks with different goals and interacting objects. However, robots usually use RL to train individual tasks, and it is less efficient in achieving learning for multiple tasks for robot to train each of the tasks individually.

SUMMARY OF THE INVENTION

In order to improve the learning efficiency of the robot, related techniques may train multiple tasks by Multi-Task Reinforcement Learning (MTRL). However, after training the multiple tasks by MTRL, if the task to be performed by the robot is a new task different from the multiple tasks, it is necessary to restart the training for the new task, resulting in low learning efficiency of the robot. Moreover, when training the new task, the relevance between the new task and the historically learned multiple tasks is not considered, resulting in poor effects in reinforcement learning.

In order to solve the above technical problems, the present disclosure provides a transfer reinforcement learning method and apparatus, and multi-task reinforcement learning method and apparatus, which may solve the problem of low learning efficiency and poor learning effects for new tasks.

A first aspect of the present disclosure provides a transfer reinforcement learning method, including: first, determining operational instructions for instructing an agent to perform a first task; then, determining an inclusion relation between multiple second tasks and the first tasks based on the operational instructions; again, determining a shared parameter set corresponding to the multiple second tasks based on the inclusion relation between the multiple second tasks and the first task, wherein the shared parameter set includes a plurality of parameters shared by the multiple second tasks; and finally, performing transfer reinforcement learning based on the shared parameter set and the first task to obtain model parameters of a target policy model corresponding to the first task.

A second aspect of the present disclosure provides a multi-task reinforcement learning method, including: first, acquiring a data information set generated during performing of each of the multiple second tasks; then, performing multi-task reinforcement learning based on the data information set of each of the second tasks to obtain a shared parameter set and parameter compositional vectors in a target multi-task policy model, wherein the shared parameter set includes a plurality of parameters shared by the multiple second tasks, and the parameter compositional vector includes a parameter vector corresponding to each of the second tasks.

A third aspect of the present disclosure provides a transfer reinforcement learning apparatus, including: a first determination module suitable for determining an operational instruction to instruct the agent to perform the first task; a second determination module suitable for determining the inclusion relation between multiple second tasks and a first task based on the operational instructions received from the first determination module; a third determination module suitable for determining a shared parameter set corresponding to the multiple second tasks based on the inclusion relation determined by the second determination module, wherein the shared parameter set includes a plurality of parameters shared by the multiple second tasks; and a transfer reinforcement learning module suitable for performing transfer reinforcement learning based on the shared parameter set determined by the third determination module and the first task to obtain the model parameters of a target policy model corresponding to the first task.

A fourth aspect of the present disclosure provides a multi-task reinforcement learning apparatus, including: a acquirement module suitable for acquiring a data information set generated during performing of each of the multiple second tasks; and a multi-task reinforcement learning module suitable for performing multi-task reinforcement learning based on the data information set of each of the second tasks acquired by the acquirement module to obtain a shared parameter set and a parameter compositional vector in the target multi-task policy model, wherein the shared parameter set includes a plurality of parameters shared by multiple second tasks, and the parameter compositional vector includes a parameter vector corresponding to each of the second tasks.

A fifth aspect of the present disclosure provides a non-transitory computer readable storage medium, in which a computer program is stored, wherein the computer program is suitable for implementing the transfer reinforcement learning method according to the first aspect above or the multi-task reinforcement learning method according to the second aspect as above.

A sixth aspect of the present disclosure provides an electronic device, including: a processor; a memory configured to store a processor-executable instruction, wherein the processor is configured to read the executable instruction from the memory, and execute the instruction to implement the transfer reinforcement learning method according to the first aspect or the multi-task reinforcement learning method according the second aspect as above.

A seventh aspect of the present disclosure provides a computer program product including a computer program instruction that, when run by a processor, cause the processor to implement the transfer reinforcement learning method according to the first aspect above or multi-task reinforcement learning method according to the second aspect as above.

Based on the transfer reinforcement learning method provided by the present disclosure, by transferring the previously learned task-agnostic shared parameter sets to the learning of a new task (e.g., a first task), it is possible to learn the new task based on the relevance between the new task and the previously learned task (e.g., the second task), so that the learning for the new task does not need to be restarted from scratch, and therefore the learning efficiency for the new task may be improved. Moreover, due to the certain relevance among multiple tasks performed by the agent, it is possible to improve the accuracy of learning new tasks and ensure better learning of new tasks by transferring the shared parameter set of multiple tasks previously learned to the learning of the new task.

BRIEF DESCRIPTION OF THE DRAWINGS

FIG. 1 is a diagram illustrating a scenario to which the present disclosure is applicable.

FIG. 2 is a schematic flowchart illustrating a transfer reinforcement learning method in accordance with an exemplary embodiment of the present disclosure.

DETAILED DESCRIPTION OF THE EMBODIMENTS

Figure 3:
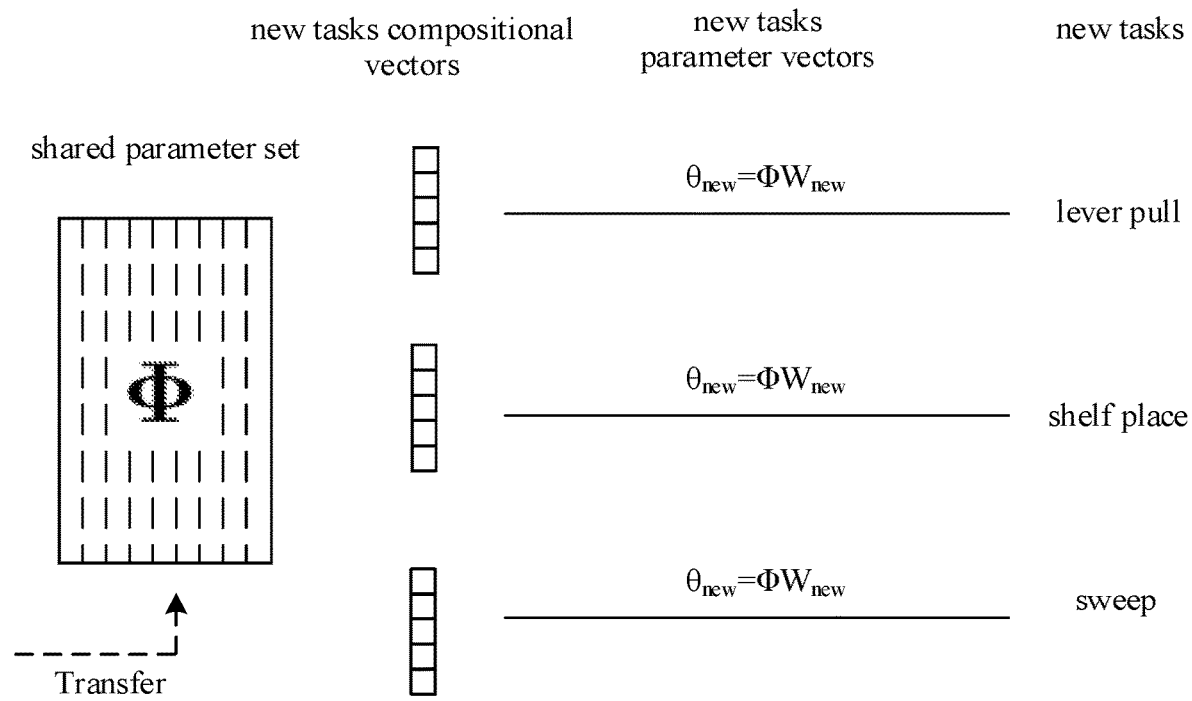
FIG. 3 is a schematic diagram illustrating an application scenario of the transfer reinforcement learning method in accordance with an exemplary embodiment of the present disclosure.

Exemplary embodiments of the present disclosure are described below in detail with reference to the accompanying drawings. Obviously, the described embodiments are merely a part, rather than all of embodiments of the present disclosure. It should be understood that the present disclosure is not limited to the exemplary embodiments described herein.

It should be noted that, unless otherwise specified, the relative arrangements, numerical expressions and values with regard to the components and steps set forth in these embodiments do not limit the scope of the present disclosure.

Application Overview

First, the application scenarios of the present disclosure are described. The transfer reinforcement learning method and the multi-task reinforcement learning method provided by embodiments of the present disclosure may be applied to a variety of scenarios in the field of artificial agent, such as an autonomous driving scenario, a robot automation control scenario in the industrial field, and any other implementable scenarios.

Exemplarily, in the field of artificial agent, an agent may continuously learn by interacting with an environment to obtain an optimal policy for performing a task. In some examples, the agent includes device or apparatus capable of interacting intelligently with the environment, such as a vehicle (e.g., a vehicle with autonomous driving capability), a robot, a robotic arm, and the like. A type of agent is not limited in the embodiments of the present disclosure.

As shown in FIG. 1, when performing task T, the agent first determines and performs an action $A_t$ to be performed based on the initial policy parameters and a current state of the agent, wherein the agent generates a new state $S_t$ through interacting with an environment by action $A_t$ while the environment gives a reward $R_t$. Then, the agent adjusts the initial policy parameters based on the new state $S_t$ and the reward $R_t$, and determines and performs the next action $A_{t+1}$ to be performed based on the adjusted policy parameters, wherein the agent generates a new state $S_{t+1}$ through interacting with the environment by action $A_{t+1}$ while the environment gives a new reward $R_{t+1}$. Once more, the agent adjusts the policy parameters again based on the new state $S_{t+1}$ and the new reward $R_{t+1}$ (or a set of collected states and reward data), and so on in an iterative cycle until the agent learns optimal policy parameters $\theta$ for completing task T. For example, the optimal policy parameters $\theta$ could be policy parameters corresponding to when the cumulative reward value for performing task T reaches a preset condition.

The agent needs to continuously collect parameters such as the environmental parameters in which the agent is located and the state parameters of the agent during the interaction with the environment in order to adjust the policy parameters for the agent to perform the task. Therefore, a variety of sensors may be provided for collecting the above parameters, which may be provided on the agent or outside the agent to be electrically connected to the agent, so that the agent may acquire the environmental parameters and state parameters collected by the sensors. In some examples, the above sensors include, but are not limited to, gyroscope sensors, distance sensors, light sensors, gravity sensors.

In related technologies, an agent may need to continuously learn new tasks during use, and whenever the agent learns a new task, the agent needs to be retrained by the policy model corresponding to the new task. The multiple tasks performed by an agent are usually relevant to each other, so the retraining of a new task may lead to a longer learning time and lower learning efficiency.

To address the problem of long learning time and low learning efficiency of an agent for learning a new task, embodiments of the present disclosure provide a transfer reinforcement learning method, which is capable of learning a new task (e.g., a first task) by using the relevance among the new task and the learned task through transferring a shared parameter set of multiple tasks (e.g., a second task) previously learned by the agent to the learning of a new task (e.g., a first task), so that the learning for the new task does not need to be restarted from scratch, with the learning time for the new task being shortened and the learning efficiency for the new task being improved. Moreover, due to the certain relevance among multiple tasks performed by the agent, it is possible to improve the accuracy of learning new tasks and ensure better learning of new tasks by transferring the policies of multiple tasks previously learned to the learning of new tasks.

Exemplary Method

FIG. 2 is a schematic flowchart illustrating a transfer reinforcement learning method in accordance with an exemplary embodiment of the present disclosure. This embodiment may be applied to an electronic device, as shown in FIG. 2. The method includes the following Step 201 to Step 204.

Step 201: determining operational instructions for instructing an agent to perform a first task.

Exemplarily, the operational instructions for the agent may include a plurality of operational instructions, respective ones of which being used to instruct the agent to perform one task, which may be implemented by a series of actions performed by the agent during its interaction with the surrounding environment.

Exemplarily, the tasks performed by the agent may vary depending on a type of the agent. For example, a robotic arm is taken as an example of the agent, the tasks performed by the agent include, but are not limited to, button press, door open, drawer close, peg insert side, lever pull, shelf place, sweep, etc. The embodiments of the present disclosure are not limited to the type of the agent, and the following embodiments are illustrated exemplarily with the agent as a robotic arm.

Exemplarily, the electronic device may determine the operational instructions for instructing the agent to perform the first task by receiving speech instructions inputted from the user. The electronic device may also determine the operational instructions for instructing the agent to perform the first task based on the environmental parameters or the state parameters of the agent. For example, the electronic device may generate the operational instructions for performing the first task when the environmental parameters or state parameters meet a preset condition. Embodiments of the present disclosure do not limit the specific manner in which the electronic device determines the operational instructions for instructing the agent to perform the first task.

In some examples, the first task may include one or more tasks, which is limited in the present disclosure embodiments. It should be noted that when the first task includes multiple first tasks, the multiple first tasks may be trained jointly by parameter compositional MTRL in order to improve the learning efficiency of the multiple first tasks. The specific way of training multiple tasks with parameter compositional MTRL may be described in the following embodiments.

Step 202: determining an inclusion relation between multiple second tasks and the first task based on the operational instructions.

Exemplarily, the multiple second tasks are tasks that the agent has previously learned. For example, the second task may be a historical task performed by the agent, and the policy models for the second tasks have already been trained when the agent performs the second tasks.

Due to the certain relevance among the multiple tasks performed by the agent, the agent, after determining the first task to be performed, may determine the inclusion of the multiple second tasks that the agent has previously learned with regard to the first task. In some examples, if the first task is included in the multiple second tasks, indicating that the first task is a task that the agent has previously learned, then the electronic device may directly perform the first task based on the policy parameters corresponding to the second task which is the same as that first task. If the first task is not included in the multiple second tasks, indicating that the first task is a new task that has never been learned by the agent, then the electronic device may proceed to perform steps 203 and 204 to learn the new task.

For example, multiple second tasks include tasks such as button press, door open, and peg insert side, and the first task includes lever pull, shelf place, and sweep. Since the multiple second tasks previously learned by the agent do not include lever pull, shelf place, and sweep, it may be determined that lever pull, shelf place, and sweep are new tasks.

Step 203: determining a shared parameter set corresponding to the multiple second tasks based on the inclusion relation between the multiple second tasks and the first task. The shared parameter set includes a plurality of parameters shared by the multiple second tasks.

Exemplarily, in the case where the multiple second tasks do not include the first task (e.g., the first task is a new task), the electronic device may determine the shared parameter set $\Phi$ corresponding to the multiple second tasks, which may include a plurality of shared parameters that are task-agnostic. Since the multiple second tasks are somewhat relevant to each other, the shared parameter set $\Phi$ of the multiple second tasks may be obtained by multi-task joint training of the multiple second tasks.

In some examples, in order to further enhance learning efficiency, multiple second tasks may be trained by parameter compositional MTRL to learn a task-agnostic parameter set (e.g., the shared parameter set), and parameter combinational vectors relevant to the respective tasks. Embodiments of the present disclosure do not limit the specific manner in which the electronic device determines the shared parameter set corresponding to the multiple second tasks, and the following embodiments provide exemplary illustrations of the manner in which the shared parameter set is determined with reference to FIGS. 6 to 9 as examples.

For example, multi-task reinforcement learning may be performed in a pre-training phrase for the second tasks such as button press, door open, and peg insert side to obtain the shared parameter set $\Phi$ corresponding to the multiple second tasks. Since the shared parameter set $\Phi$ is task-agnostic, the shared parameter set $\Phi$ may be transferred to the learning of new tasks (such as lever pull, shelf place and sweep) in order to shorten the learning time for the new task and improve the learning efficiency for the new task.

Step 204: performing transfer reinforcement learning based on the shared parameter set and the first task to obtain model parameters of a target policy model corresponding to the first task.

Exemplarily, the shared parameter set $\Phi$ is a task-agnostic parameter set learned from the multiple second tasks. Because there is usually the certain relevance between the multiple tasks performed by the agent, it is possible to cause the electronic device to learn the first task based on the previously learned shared parameter set $\Phi$ by transferring the task-agnostic shared parameter set $\Phi$ learned from the multiple second tasks to the learning of the first task, instead of starting the learning from scratch, and therefore it is possible the learning time for the first task is shortened and the learning efficiency for the first task is improved.

For example, as shown in FIG. 3, if the task to be performed by the electronic device is the lever pull task and the lever pull task is a new task that has never been performed by the agent, then the electronic device may transfer the shared parameter set Φ obtained in the pre-training phase to the learning of the new task of lever pull, that is, the electronic device may perform the learning for the new task of lever pull based on the previously learned shared parameter set.

The present disclosure provides a transfer reinforcement learning method that may improve learning efficiency by transferring a shared parameter set Φ corresponding to multiple second tasks previously learned by an agent to the learning of a new task (e.g., a first task). Compared with related techniques in which an agent needs to initialize the model parameters of the policy model corresponding to the new task and relearn is started from scratch when performing a new task, Due to the relevance between multiple tasks performed by an agent, the present disclosure may shorten the learning time for a new task and improve the learning efficiency for the new task by transferring the shared parameter set Φ previously learned by the agent to the learning of the new task when learning the new task, so that the learning for the new task does not need to be started from scratch. In other words, the present disclosure may improve the learning efficiency for new tasks by exploiting the task relevance between new tasks and previously learned tasks.

Typically, the types and number of tasks that an agent needs to learn are large, and if the agent performs training on the individual tasks one by one, then multiple policy models are needed for training on the multiple tasks respectively. However, the multiple tasks performed by an agent are usually related to each other, so the training on the individual tasks may lead to low learning efficiency of the robot. In order to improve the learning efficiency, one policy model may be used for training on multiple tasks. However, different tasks have respective requirements for the adjustment of model parameters during the learning process, and the tasks are more, it easily occurs that inconsistent requirements are the more, which may lead to conflicts in the learning of multiple tasks, resulting in poor performance of the learned model parameters for the subsequent performing of the tasks.

In some embodiments, in order to enhance the learning effect of multi-task learning, a new task may be learned by parameter compositional MTRL based on the shared parameter set Φ corresponding to multiple second tasks previously learned by the agent to learn the policy parameters corresponding to the new task. The method of learning a new task by parameter compositional MTRL is described below in conjunction with FIG. 4 and FIG. 5.

Figure 4:
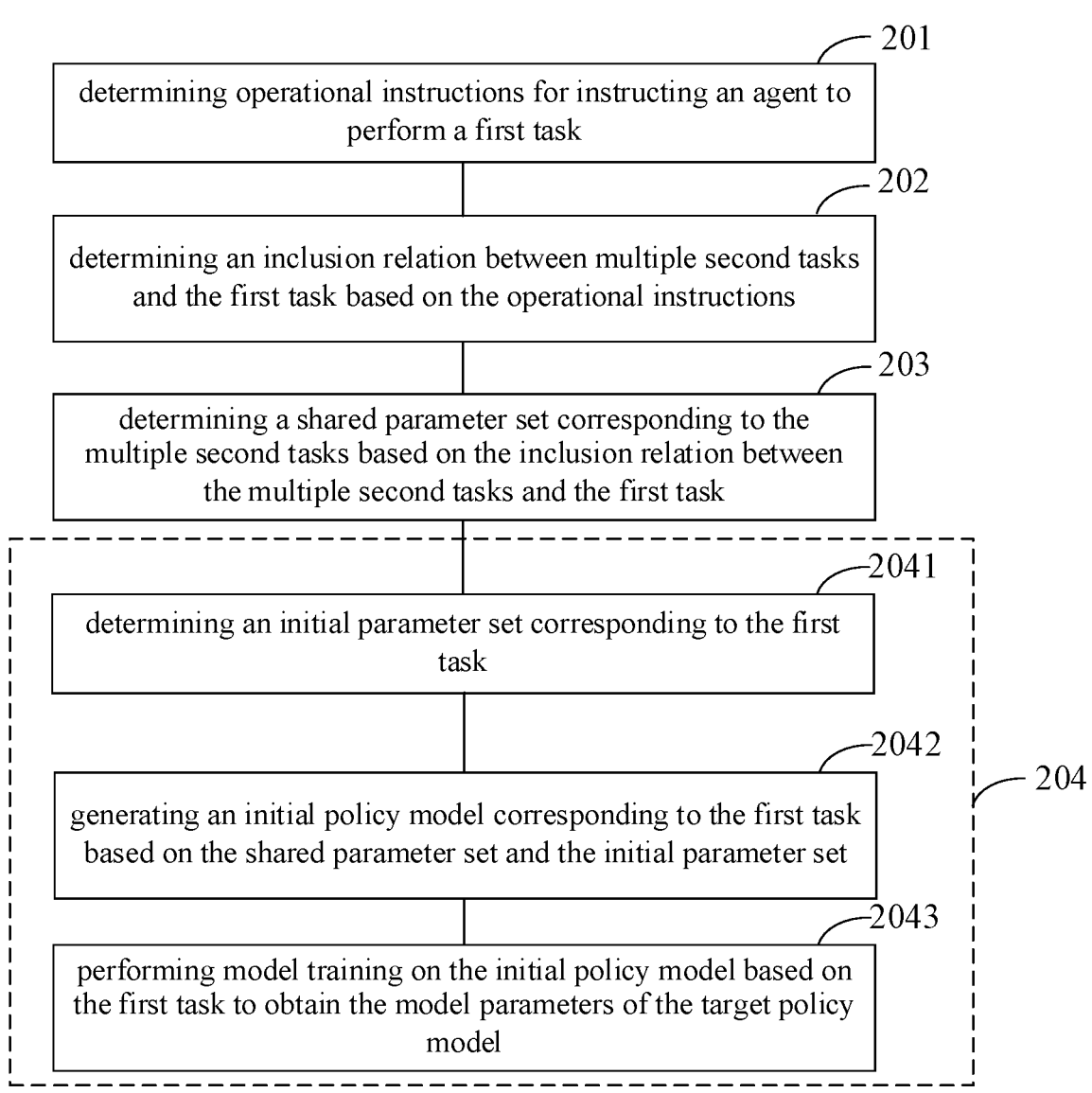
FIG. 4 is a schematic flowchart illustrating the transfer reinforcement learning method in accordance with another exemplary embodiment of the present disclosure.

As shown in FIG. 4, based on the embodiment shown in FIG. 2 above, Step 204 may include Step 2041 to Step 2043 as follows.

Step 2041: determining an initial parameter set corresponding to the first task.

Exemplarily, the initial parameter set corresponding to the first task may be initialized first when learning the first task. For example, as shown in FIG. 3, a task of lever pull is taken as an example of the first task, the initial parameter set $W_{new}$ determined in Step 2041 includes initial parameter vectors corresponding to the task of lever pull.

Furthermore, for example, as shown in FIG. 3, it is taken as an example, that the first task includes multiple tasks, the multiple first tasks including tasks of lever pull, shelf place, and sweep, Step 2041 may determine the initial parameter set $W_{new}$ corresponding to each of the first tasks, respectively. For example, Step 2041 may determine the initial parameter sets $W_{new1}$, $W_{new2}$ and $W_{new3}$ corresponding to the tasks of lever pull, shelf place and sweep, respectively.

Another example is that in order to improve the learning efficiency of multiple first tasks, the initial parameter set $W_{new}$ determined in Step 2041 may also include the initial parameter vectors corresponding to the tasks of lever pull, shelf place, and sweep, respectively, so that the tasks of lever pull, shelf place, and sweep may be learned jointly together to improve the learning efficiency.

In some examples, determining the initial parameter set corresponding to the first task in Step 2041 includes determining the initial parameter set $W_{new}$ based on a number of columns of the shared parameter set Φ. For example, a number of rows of this initial parameter set $W_{new}$ is equal to the number of columns of the shared parameter set Φ.

Step 2042: generating an initial policy model corresponding to the first task based on the shared parameter set and the initial parameter set.

In some examples, when training on a new task by parameter compositional MTRL, the initial policy model may be constructed based on the shared parameter set and the initial parameter set. For example, as shown in FIG. 3, the initial policy model $θ_{new}$ may be constructed based on the shared parameter set Φ and the initial parameter set $W_{new}$ by the following equation:

$$θ_{new} = ΦW_{new}$$

It should be noted that since the second tasks previously learned by the agent is relevant to the new task, the target policy model corresponding to the first task may be quickly learned from the initial policy model composed by the initial parameter set $W_{new}$ and the task-agnostic shared parameter set Φ learned by the second tasks by iteratively performing an adjustment on the model parameters of the initial policy model during the learning of the new task. Since the initial policy model of the present disclosure for learning a new task is used for the learning of the new task on the basis of the previously learned shared parameter set Φ and the shared parameter set Φ is a task-agnostic shared parameter, the learning of the new task is not started from scratch, which may improve the learning efficiency for the new task.

Step 2043: performing model training on the initial policy model based on the first task to obtain the model parameters of the target policy model.

Exemplarily, when learning the first task, based on the initial policy model and data information during performing of the first task collected by sensors provided on the agent, the electronic device may iteratively adjust the model parameters of the initial policy model based on the data information, and the learning of the first task is completed until a target policy model satisfying the preset condition is obtained.

In some examples, the electronic device may adjust only the parameters in the initial parameter set $W_{new}$ without adjusting the parameters in the shared parameter set Φ when model training is performed on the initial policy model based on the first task, or it may adjust both the parameters in the initial parameter set $W_{new}$ and the parameters in the shared parameter set Φ, without limitation in this embodiment of the present disclosure.

For example, when learning the first task based on the initial policy model $θ_{new}$, the electronic device may adjust only the parameters in the initial parameter set $W_{new}$ in the initial policy model $θ_{new}$ until the target policy model satisfying the preset condition is obtained. In this implementation, the shared parameter set $\Phi$ in the initial policy model $\theta_{new}$ is the same as the shared parameter set $\Phi$ in the target policy model $\theta'_{new}$.

Furthermore, for example, when learning the first task based on the initial policy model $\theta_{new}$, the electronic device may adjust both the parameters in the initial parameter set W new in the initial policy model $\theta_{new}$ and the parameters in the shared parameter set $\Phi$ until the target policy model satisfying the preset condition is obtained. In this implementation, the shared parameter set $\Phi$ in the initial policy model $\theta_{new}$ may be different from the shared parameter set $\Phi'$ in the target policy model $\theta'_{new}$.

According to the transfer reinforcement learning method provided by this disclosure embodiment, when learning a new task, through performing parameter compositional MTRL by the previously learned shared parameter set $\Phi$ and the initial parameter set $W_{new}$, it is possible that relearning may be performed on the new task based on the basis of the previously learned shared parameter set $\Phi$ without restarting the learning from scratch, the learning efficiency for the new task be improved. Moreover, when the new task includes multiple tasks, the learning effect for multiple new tasks may be further improved by learning multiple new tasks together by parameter composition.

In some embodiments, a new task may be learned by data collection and sample learning. In particular, the data collection refers to collecting sample data (e.g., state data and reward values) that needs to be learned through interacting by the agent with the environment. The sample learning s means that the policy parameters are iteratively adjusted based on the collected sample data in order to learn the optimal policy parameters corresponding to the new task. The learning method for a new task is described illustratively below in conjunction with FIG. 5.

Figure 5:
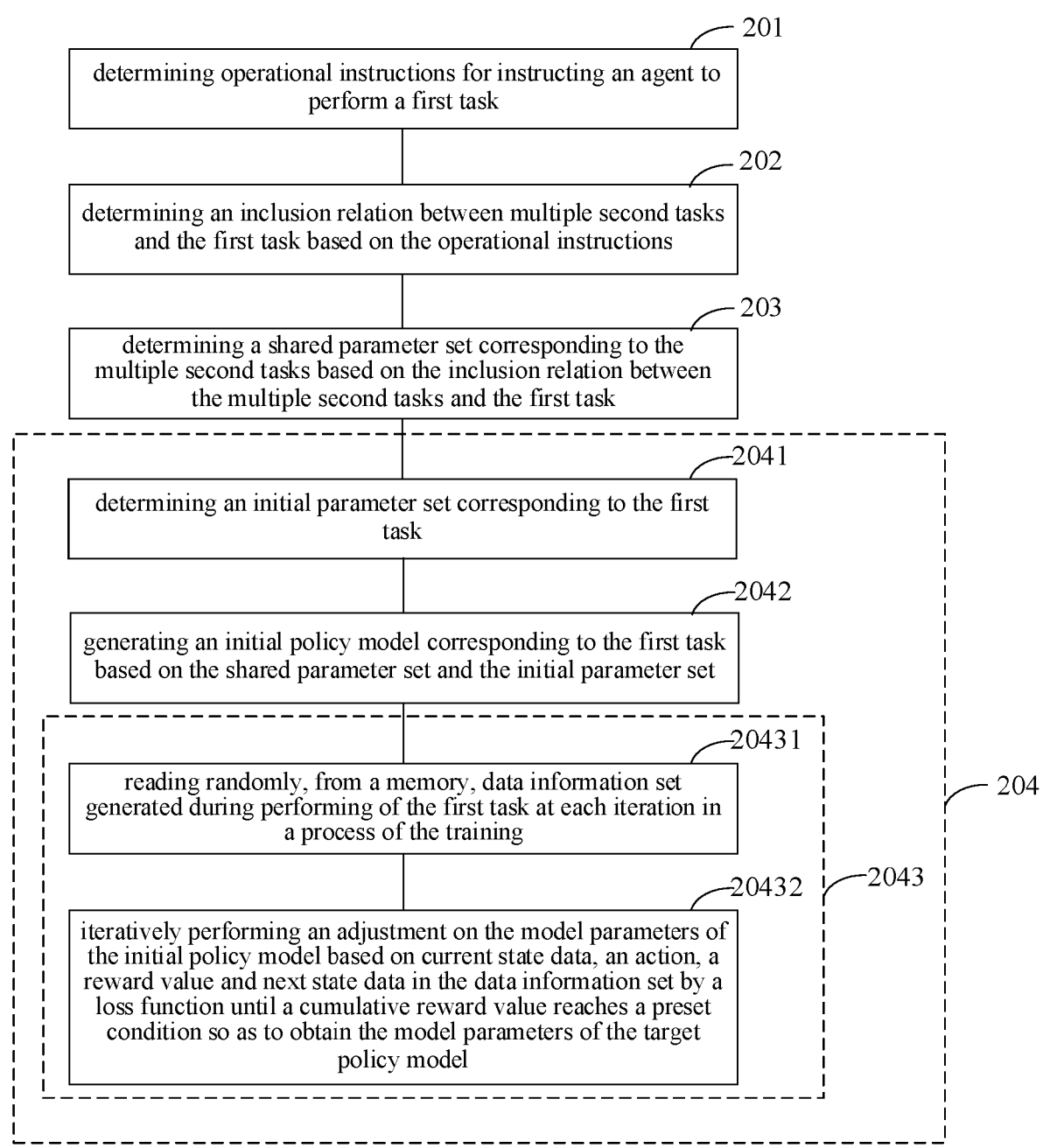
FIG. 5 is a schematic flowchart illustrating the transfer reinforcement learning method in accordance with yet another exemplary embodiment of the present disclosure.

As shown in FIG. 5, based on the embodiment shown in FIG. 4 as above, Step 2043 may include Step 20431 to Step 20432.

Step 20431, reading randomly, from a memory, data information set generated during performing of the first task at each iteration in a process of the training.

Exemplarily, when learning the first task based on the initial policy model $\theta_{new}$, current state data $S_0$ collected by the sensor may be processed based on the initial policy model $\theta_{new}$ to generate and perform an action $A_0$ to be performed, where the agent may generate a next state data $S_1$ through interacting with the environment by the action $A_0$, while the environment may give a reward value $R_1$. The electronic device may store the current state data $S_0$, the action $A_0$, the next state data $S_1$ and the reward value R in the memory (i.e., data collection) when the next state data $S_1$ and the reward value $R_1$ are obtained. In this way, the actions, the state data and the reward values generated during performing of the first task are continuously collected.

In some examples, a series of data information sets may be collected in the memory during performing of the first task, each data information set including current state data, action, reward value, and next state data. It is noted that the current state data in each data information set is current state data relative to the next state obtained after interaction with the environment, that is, the current state data in each data information set is previous state data of the next state data in the data information set. When performing model training, the initial policy model $\theta_{new}$ may be trained iteratively, and the data information set generated during performing of the first task may be read randomly from the memory at each iteration of training.

Step 20432: iteratively performing an adjustment on the model parameters of the initial policy model based on current state data, an action, a reward value and next state data in the data information set by a loss function until a cumulative reward value reaches a preset condition so as to obtain the model parameters of the target policy model.

Exemplarily, during learning a new task, a batch of data information sets may be read randomly from the memory at each iteration, which may include a N sets of current state data, actions, reward values and next state data, denoted as $$\{(S'_i, A'_i, R'_{i+1}, S'_{i+1})\}_{i=1 \ldots N},$$

and based on these current state data, actions, reward values and next state data, the model parameters of the initial policy model are adjusted by the loss function. The processes are iterated until the cumulative reward values reach the preset condition so as to obtain the model parameters of the target policy model.

In some examples, the preset condition comprising: the cumulative reward value is greater than a preset threshold value, or, the cumulative reward value reaches a maximum value. Embodiments of the present disclosure do not limit the content of the preset conditions, and the target policy when the cumulative reward value reaches a maximum value may be referred to as the optimal policy.

In some implementations, Step 20432 may include: iteratively performing the adjustment on an initial parameter set in the initial policy model based on the current state data, the action, the reward value, and the next state data in the data information set by the loss function until the cumulative reward value reaches the preset condition so as to obtain the model parameters of the target policy model.

Alternatively, Step 20432 may also include: iteratively performing the adjustment on the initial parameter set and the shared parameter set in the initial policy model based on the current state data, the action, the reward value and the next state data in the data information set by the loss function until the cumulative reward value reaches a preset condition so as to obtain the model parameters of the target policy model.

Based on the above two implementations, it may be seen that the electronic device may adjust only the parameters in the initial parameter set $W_{new}$ without adjusting the previously learned shared parameter set $\Phi$ when learning a new task. It is also possible to adjust both the parameters in the previously learned shared parameter set $\Phi$ and the parameters in the initial parameter set $W_{new}$. This embodiment of the disclosure does not limit the way in which the model parameters of the initial policy model are adjusted for learning a new task.

According to the transfer reinforcement learning method provided by this disclosed embodiment, when learning the new task, the learning efficiency for the new task may be improved by transferring the shared parameter set $\Phi$ corresponding to multiple second tasks previously learned by the agent to the learning of the new task by use of the relevance between the new task and the previously learned tasks. Moreover, through data collection and sample learning for the new task and iteratively performing the adjustment on the model parameters by the loss function, it may be ensured that the learned target policy is more accurate.

Figure 6:
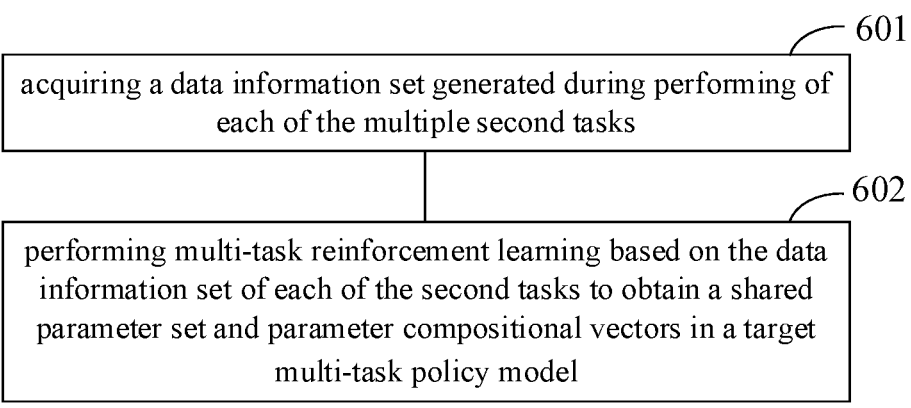
FIG. 6 is a schematic flowchart illustrating a multi-task reinforcement learning method in accordance with an exemplary embodiment of the present disclosure.

In order to enhance the learning efficiency of multi-task learning, the present disclosure also provides a multi-task reinforcement learning method that learns multiple second tasks to obtain the shared parameter set used in Step 203 as above. FIG. 6 is a schematic flowchart illustrating a multi-task reinforcement learning method in accordance with an exemplary embodiment of the present disclosure. This embodiment may be applied to an electronic device, and the method includes Step 601 to Step 602, as shown in FIG. 6.

Step 601, acquiring a data information set generated during performing of each of the multiple second tasks.

Exemplarily, the second task may be a task that has been performed previously by the agent, relative to the new task to be learned in the above transfer reinforcement learning. The agent generates a plurality of actions during the performing of the second tasks and may generate a plurality of state parameters through the interaction of the actions with the environment. The data information set generated during performing of the above second task may include current state data, actions, next state data, and reward values generated by the agent during the performing of the second task.

Figure 7:
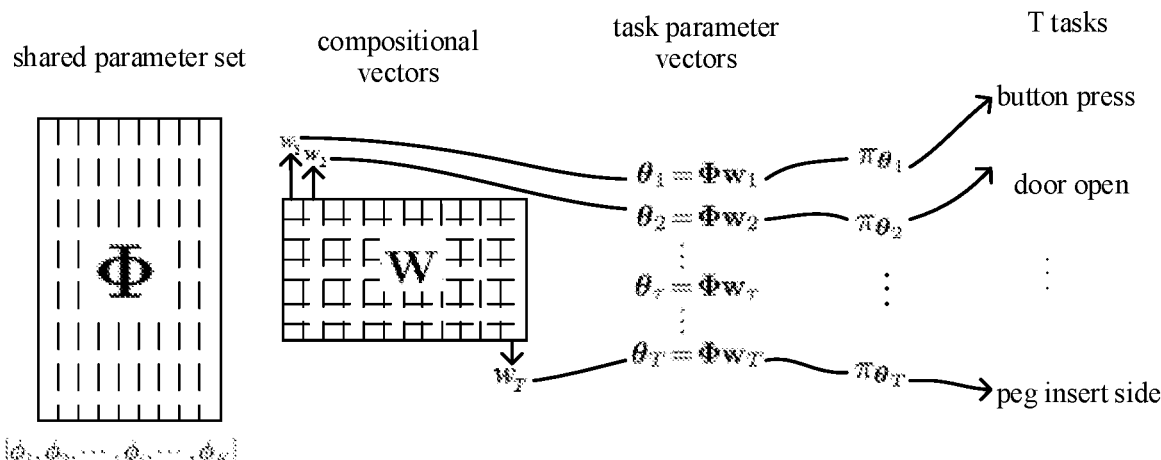
FIG. 7 is a schematic diagram illustrating an application scenario of a multi-task reinforcement learning method in accordance with an exemplary embodiment of the present disclosure.

For example, as shown in FIG. 7, multiple second tasks include tasks of button press, door open and peg insert side, etc. Taking a robotic arm as an example of the agent, for example, the robotic arm may generate a series of actions, state data and reward values when performing the task of button press until the robotic arm successfully presses the button and the task of button press is performed successfully.

In some examples, in order to further enhance the learning efficiency of multi-task learning, different multiple second tasks may be learned in order to avoid learning the same task repeatedly.

Step 602: performing multi-task reinforcement learning based on the data information set of each of the second tasks to obtain a shared parameter set and parameter compositional vectors in a target multi-task policy model.

wherein the shared parameter set includes a plurality of parameters shared by multiple second tasks, and the parameter compositional vectors includes parameter vectors corresponding to the respective second tasks.

Exemplarily, due to the relevance between the multiple tasks performed by the agent, learning of multiple tasks may be performed by parameter composition to learn a task-agnostic shared parameter set and a task-specific parameter vector.

In some examples, the shared parameter set $\Phi$ includes multiple shared parameter vectors, such as, $\Phi=[\Phi_1, \Phi_2, \ldots, \Phi_i, \ldots, \Phi_k]$ where k denotes a number of shared parameter vectors included in the shared parameter set, $1 \leq i \leq k$.

Exemplarily, each column in the shared parameter set $\Phi$ represents a shared parameter vector, and each shared parameter vector may be a policy model, and each policy model may be used to accomplish a certain task or a certain skill.

Exemplarily, a linear combination of multiple shared parameter vectors in a shared parameter set $\Phi$ may also be a policy model, such that multiple policy models may be generated based on the shared parameter set $\Phi$. The set consisting of linear combinations of multiple shared parameter vectors may be called a policy subspace.

In some examples, the parameter compositional vector W includes the parameter vectors corresponding to the respective second tasks, such as the parameter compositional vector may be expressed as $W=[w_1, \ldots, w_\tau, \ldots, w_T]$, where T is a number of the multiple second tasks. That is, the parameter compositional vector includes the parameter vectors corresponding to the T second tasks, respectively.

For example, as shown in FIG. 7, as an example, multiple second tasks include tasks of button press, door open, and peg insert side, the parameter vector corresponding to the task of button press is $w_1$ in the parameter compositional vector W, the parameter vector corresponding to the task of door open is $w_2$ in the parameter compositional vector W, and the parameter vector corresponding to the task of peg insert side is $w_T$ in the parameter compositional vector W.

Exemplarily, the present disclosure may, in the pre-training phase, perform multi-task reinforcement learning based on the data information sets during performing of each of second task in the multiple second tasks to obtain a task-agnostic shared parameter set (i.e., shared by the multiple second tasks), and task-specific parameter vectors. Thereby, when agents perform a new task in a subsequent phrase, the electronic device may transfer the task-agnostic shared parameter sets learned by multiple second tasks to the learning of the new task, in order to learn the new task based on the relevance between the new task and the previously learned second tasks without learning the new task from scratch, which may improve the learning efficiency for the new task.

According to the multi-task reinforcement learning method provided by the present disclosure, a shared parameter set $\Phi$ and a parameter compositional vector W are obtained by training on multiple second tasks, the shared parameter set $\Phi$ including shared parameters applicable to multiple tasks. That is, the present disclosure is able to improve the learning efficiency for multiple tasks by combining task-specific parameters and task-agnostic parameters for training when learning multiple tasks, without training a network model for each of the tasks individually. Moreover, for the learning of the multiple tasks, even if the requirements of multiple tasks are inconsistent, conflicts in multi-task training may be reduced by adjusting task-specific parameters to ensure that the target multi-task policy model obtained from training is more accurate.

Figure 8:
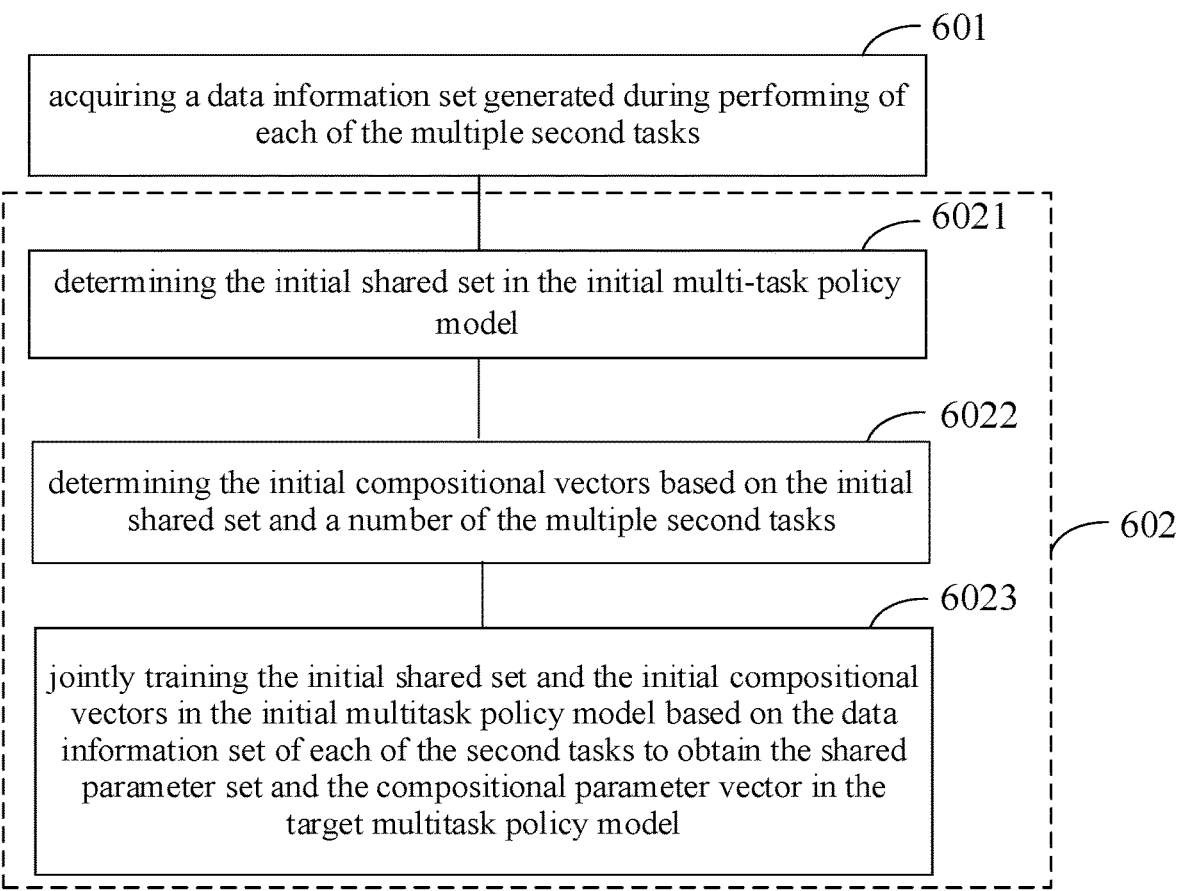
FIG. 8 is a schematic flowchart illustrating a multi-task reinforcement learning method in accordance with another exemplary embodiment of the present disclosure.

As shown in FIG. 8, based on the embodiment shown in FIG. 6 as above, Step 602 may include Step 6021 to Step 6023 as follows.

Step 6021: determining the initial shared set in the initial multi-task policy model.

Exemplarily, the initial multi-task policy model $\theta_0$ includes an initial shared set $\Phi_0$, which includes a plurality of initial shared vectors.

In some examples, the number of initial shared vectors included in the initial shared set $\Phi_0$ is a hyper-parameter, which may be set empirically.

In some examples, in learning multiple second tasks, in order to learn common features of the multiple second tasks (e.g., parameters shared by the multiple second tasks), a number of initial shared vectors included in the initial shared set $\Phi_0$ may be determined based on the number of the multiple second tasks. Exemplarily, the above determining of the initial shared set in the initial multi-task policy model may include: determining a number of column vectors included in the initial shared set based on the number of the multiple second tasks; and generating the initial shared set based on the number of column vectors included in the initial shared set.

In some examples, the number of column vectors included in the initial shared set may be smaller than the number of the multiple second tasks, so that common features of the multiple second tasks may be learned when the multiple second tasks are learned. Embodiments of the present disclosure do not limit a number of rows of the initial shared set $\Phi_0$.

For example, as shown in FIG. 7, the initial shared set $\Phi_0$ includes k initial shared vectors and the number of second tasks is T. In order to learn the parameters shared by T second tasks, the number k of column vectors included in the initial shared set $\Phi_0$ may be set to an integer less than T when determining the initial shared set $\Phi_0$. After determining the number k of column vectors included in the initial shared set $\Phi_0$, the parameters in the initial shared set $\Phi_0$ may be generated randomly.

Step 6022: determining the initial compositional vectors based on the initial shared set and a number of the multiple second tasks.

Exemplarily, the initial multi-task policy model $\theta_0$ also includes initial compositional vectors $W_0$ (or matrix when T>1), which may be determined based on the number of columns k of the initial shared set $\Phi_0$, and the number T of the multiple second tasks.

For example, the number of multiple second tasks is T and the number of columns of the initial shared set $\Phi_0$ is k. In determining the initial compositional vectors $W_0$, this initial compositional vectors $W_0$ includes the initial parameter vector corresponding to each of the second tasks, so the number of initial parameter vectors included in the initial compositional vectors $W_0$ is T. Moreover, the initial multi-task policy model $\theta_0$ is formed by combining the initial compositional matrix $W_0$ and the initial shared set $\Phi_0$, so the initial compositional vectors $W_0$ has a number of rows which is the same as the number of columns of the initial shared set $P_0$. That is, the initial compositional vectors $W_0$ has a dimension of k*T, and the dimension of each initial compositional vector (i.e., each column of $W_0$) is k*1.

Step 6023: jointly training the initial shared set and the initial compositional vectors in the initial multitask policy model based on the data information set of each of the second tasks to obtain the shared parameter set and the compositional parameter vector in the target multitask policy model.

Exemplarily, an initial multi-task policy model $\theta_0$ may be constructed based on initial compositional vectors $W_0$ and an initial shared set $\Phi_0$, where $\theta_0=\Phi_0 W_0$.

For example, the multiple second tasks include tasks of button press, door open and peg insert side, the initial compositional vectors $W_0$ includes the initial parameter vector $W_{01}$ corresponding to the task of button press, initial parameter vector $W_{02}$ corresponding to the task of door open and the initial parameter vector $W_{03}$ corresponding to the task of peg insert side. i.e. $W_0=[W_{01}, W_{02}, W_{03}]$. The initial multi-task policy model $\theta_0=\Phi_0 W_0$, which includes the sub-initial policy model $_0W_{01}$ corresponding to the task of button press, the sub-initial policy model $\Phi_0 W_{02}$ corresponding to the task of door open and the sub-initial policy model $\Phi_0 W_{03}$ corresponding to the task of peg insert side, that is, the initial multi-task policy model includes the sub-initial policy models corresponding to the respective tasks.

According to the multi-task reinforcement learning method provided by the present disclosure, when learning multiple tasks, the learning efficiency of the multiple tasks may be improved by generating a task-agnostic initial shared set and a task-specific initial compositional vector, and learning is performed on the multiple tasks based on the initial shared set and the initial compositional vector, without training a network model for each of the tasks individually. Moreover, for the learning of the multiple tasks, even if the requirements of multiple tasks are inconsistent, conflicts in multi-task training may be reduced by adjusting the task-specific parameters to ensure that the trained target multi-task policy model is more accurate.

Figure 9:
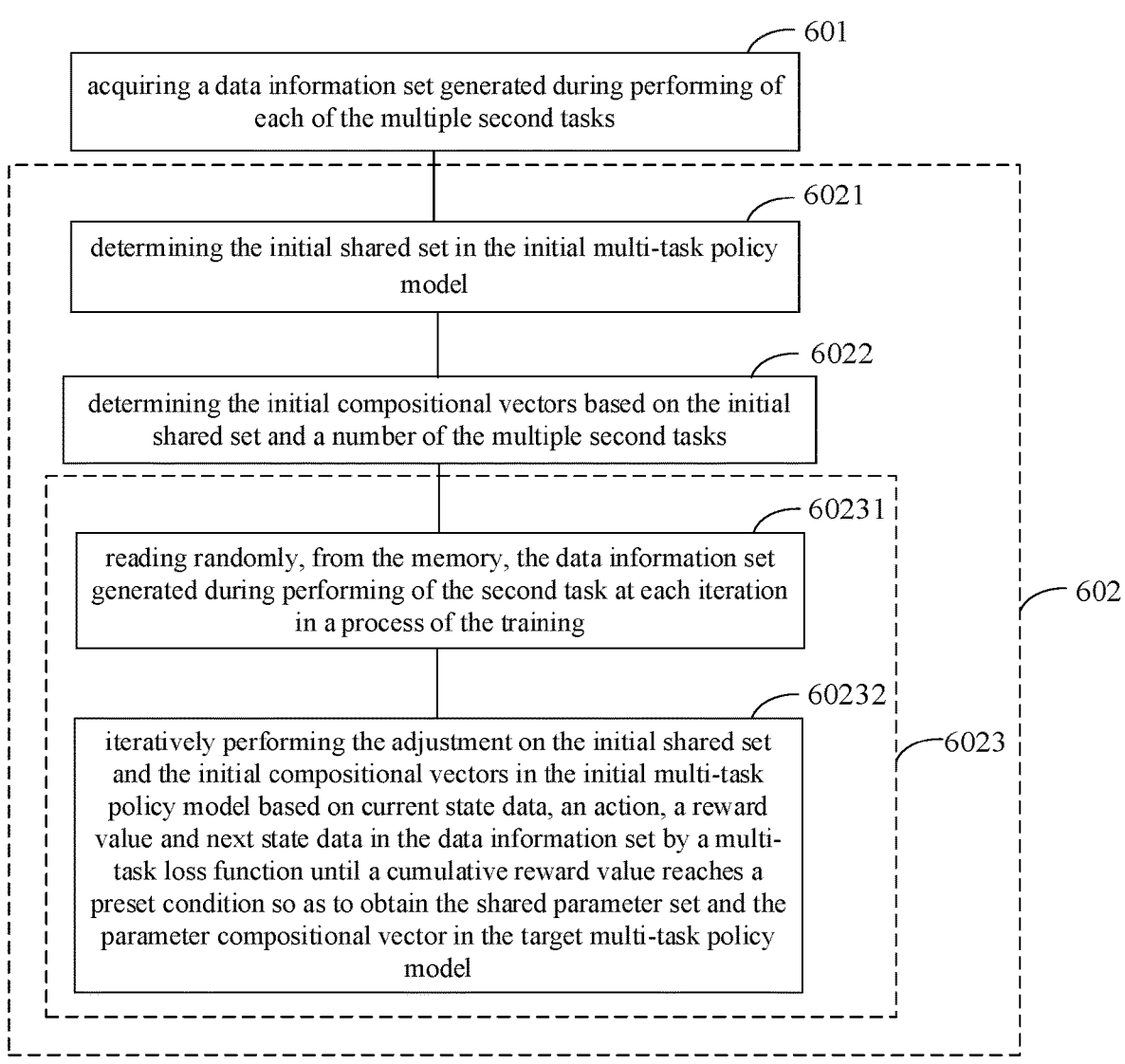
FIG. 9 is a schematic flowchart illustrating a multi-task reinforcement learning method in accordance with another exemplary embodiment of the present disclosure.

As shown in FIG. 9, based on the embodiment shown in FIG. 8 as above, Step 6023 may include Step 60231 to Step 60232.

Step 60231, reading randomly, from the memory, the data information set generated during performing of the second task at each iteration in a process of the training.

Exemplarily, when learning the multiple second tasks based on the initial multi-task policy model $\theta_0$, current state data $S'_0$ in the data information sets of each of the second tasks may be processed based on the initial multi-task policy model $\theta_0$ to generate and perform the action $A'_0$, where the agent generates a next state data $S'_1$ through interact with the environment by the action $A'_0$, while the environment gives a reward value $R'_1$. The electronic device may store, in memory, the state data $S'_0$, the action $A'_0$, and the reward value $R'_1$ when each of the state data $S'_1$ and the reward value $R'_1$ is acquired by the agent. In this way, the action, the state data and reward values generated during the performing each of the second tasks are continuously collected.

In some examples, a series of data information sets during performing of the second task may be collected in the memory, each data information set including current state data, action, reward value, and next state data. During model training, the initial multi-task policy model $\theta_0$ may be trained iteratively, and the data information sets during performing of the second task may be read randomly from the memory at each iteration of the training.

Step 60232: iteratively performing the adjustment on the initial shared set and the initial compositional vectors in the initial multi-task policy model based on current state data, an action, a reward value and next state data in the data information set by a multi-task loss function until a cumulative reward value reaches a preset condition so as to obtain the shared parameter set and the parameter compositional vector in the target multi-task policy model.

Exemplarily, in the process of learning multiple second tasks, a batch of data information sets may be read from the memory at each iteration, including L sets of current state data, actions, reward values and next state data, denoted as $\{(S'_i, A'_i, R'_{i+1}, S'_{i+1})\}_{i=1 \ldots L}$, and based on these current state data, actions, reward values and next state data, the initial shared set $\Phi_0$ and the initial compositional vectors $W_0$ in the initial multi-task policy model $\theta_0$ are adjusted by the multi-task loss function. The process is continuously iterated until the cumulative reward values reach the preset condition so as to obtain the shared parameter set and parameter compositional vector in the target multi-task policy model.

In some examples, the preset condition comprising: the cumulative reward value is greater than a preset threshold value, or, the cumulative reward value reaches a maximum value. Embodiments of the present disclosure do not limit the content of the preset conditions, and the target policy when the cumulative reward value reaches a maximum value may be referred to as the optimal policy.

As shown in FIG. 7, after multi-task reinforcement learning for multiple second tasks such as button press, door open and peg insert side, a target multi-task policy model $\theta$ may be obtained, expressed by $0=\Phi W$, where $\Phi$ is the learned shared parameter set and W is the learned parameter compositional vector. With reference to FIG. 3, when learning a new task (e.g., lever pull), the agent may transfer the previously learned task-agnostic shared parameter set $\Phi$ to the learning of the new task, so that the learning may be performed further on the new task based on the relevance between the new task and the previously learned second tasks without the learning being started on the new task from scratch, which may improve the learning efficiency and learning effect for the new task.

Exemplary Apparatus

Figure 10:
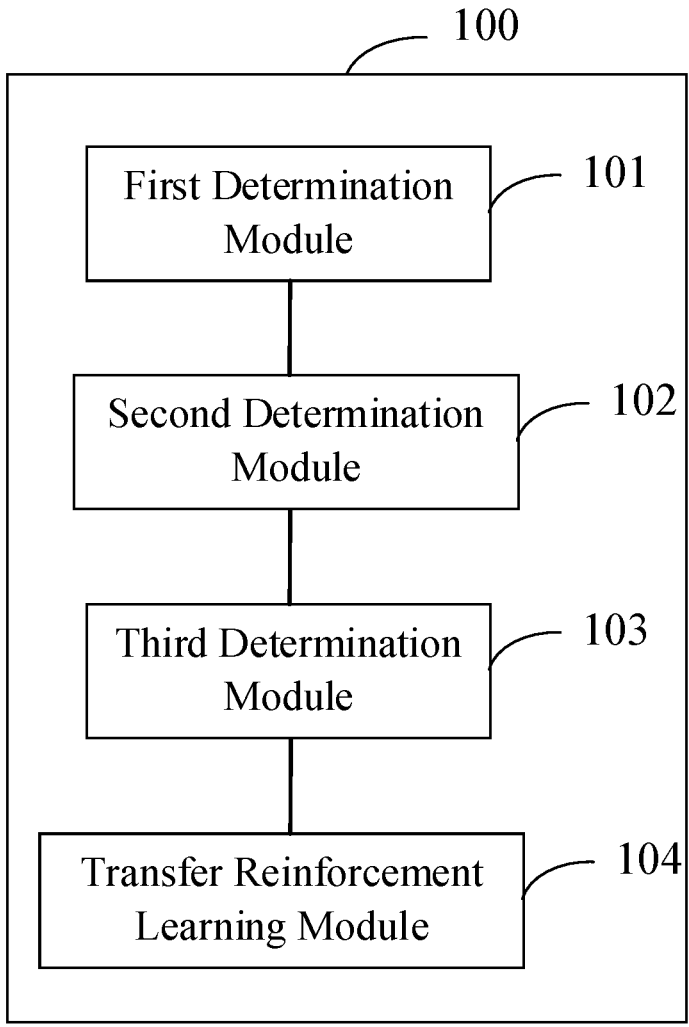
FIG. 10 is a block diagram illustrating a configuration of a transfer reinforcement learning apparatus in accordance with an exemplary embodiment of the present disclosure.

FIG. 10 illustrates a transfer reinforcement learning apparatus in accordance with an embodiment of the present disclosure, As shown in FIG. 10, the transfer reinforcement learning apparatus 100 includes a first determination module 101, a second determination module 102, a third determination module 103, and a transfer reinforcement learning module 104.

The first determination module 101 is suitable for determining an operational instruction to instruct the agent to perform the first task.

The second determination module 102 is suitable for determining the inclusion relation between multiple second tasks and a first task based on the operational instructions received from the first determination module 101.

The third determination module 103 is suitable for determining a shared parameter set corresponding to the multiple second tasks based on the inclusion relation determined by the second determination module 102. The shared parameter set includes a plurality of parameters shared by the multiple second tasks.

The transfer reinforcement learning module 104 is suitable for performing transfer reinforcement learning based on the shared parameter set determined by the third determination module 103 and the first task to obtain the model parameters of a target policy model corresponding to the first task.

Figure 11:
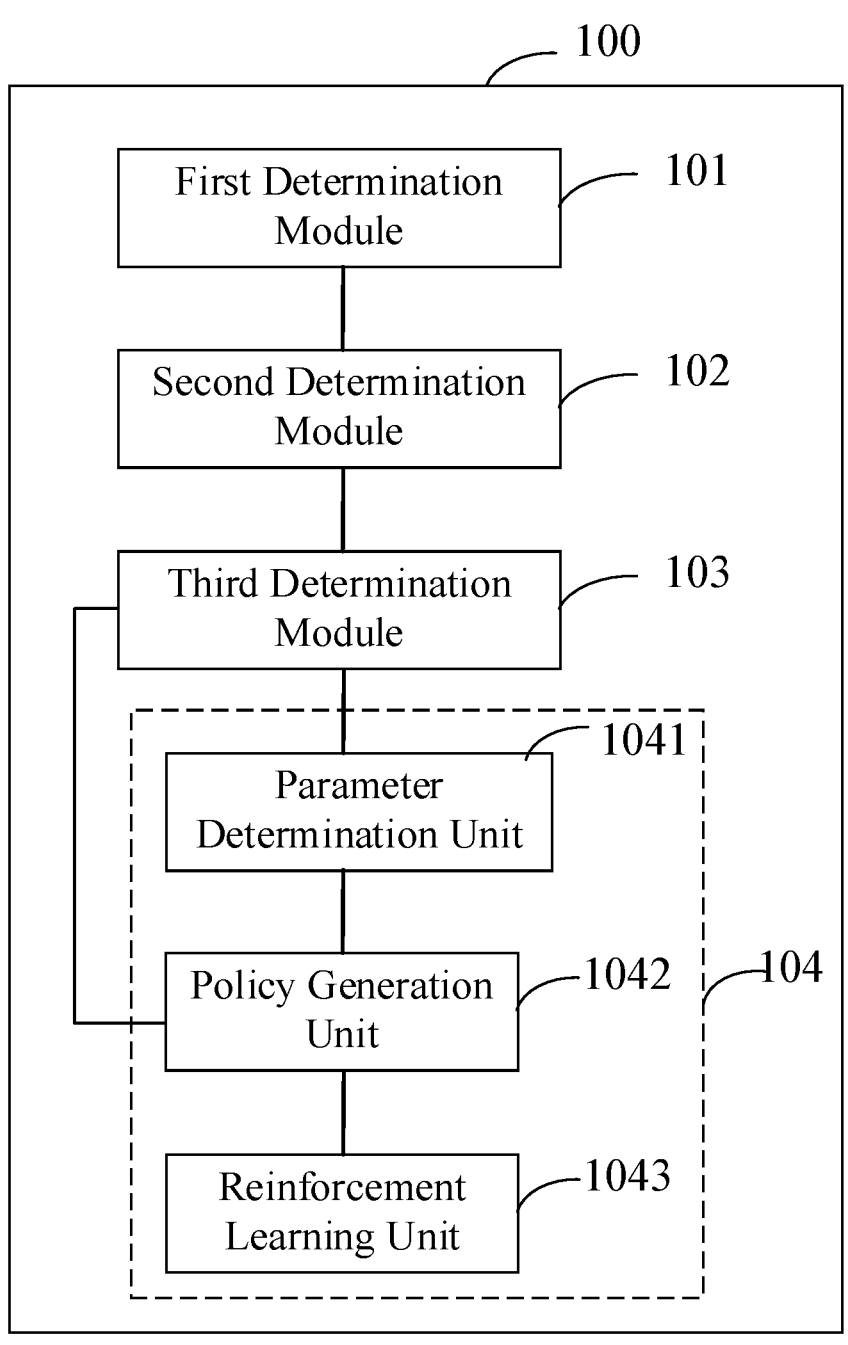
FIG. 11 is a block diagram illustrating a configuration of a transfer reinforcement learning apparatus in accordance with another exemplary embodiment of the present disclosure.

In some embodiments, as shown in FIG. 11, the transfer reinforcement learning module 104 includes a parameter determination unit 1041, a policy generation unit 1042, and a reinforcement learning unit 1043, wherein the parameter determination unit 1041 is suitable for determining the initial parameter set corresponding to the first task. The policy generation unit 1042 is suitable for generating an initial policy model corresponding to the first task based on the shared parameter set determined by the third determination module 103 and the initial parameter set determined by the parameter determination unit 1041. The reinforcement learning unit 1043 is suitable for performing model training on the initial policy model generated by the policy generation unit 1042 based on the first task to obtain the model parameters of the target policy model.

In some embodiments, the reinforcement learning unit 1043 is specifically used for randomly reading the data information set, from the memory, during performing of the first task at each iteration of the training process; and based on current state data in the data information set, an action, a reward value and next state data, the model parameters of the initial policy model generated by the policy generation unit 1042 are adjusted iteratively by a loss function until a cumulative reward value reaches a preset condition so as to obtain the model parameters of the target policy model.

In some embodiments, the reinforcement learning unit 1043 is specifically also used for iteratively performing an adjustment on the initial parameter set in the initial policy model by the loss function based on the current state data, the action, the reward value, and the next state data in the data information set until the cumulative reward value reaches the preset condition so as to obtain the model parameters of the target policy model; or, iteratively adjusted the initial parameter set and the shared parameter set in the initial policy model by the loss function based on the current state data, the action, the reward value and the next state data in the data information set until the cumulative reward value reaches the preset condition, and the model parameters of the target policy model are obtained.

The beneficial technical effects corresponding to the above exemplary embodiments of the transfer reinforcement learning apparatus 100 may refer to the corresponding beneficial technical effects in the above exemplary method and will not be repeated here.

Figure 12:
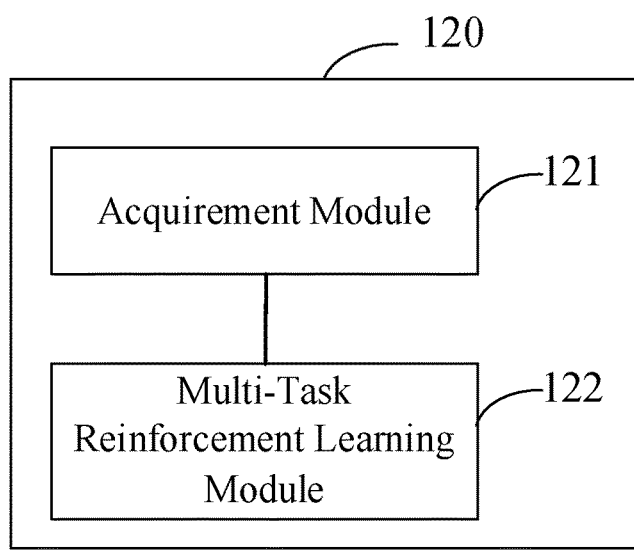
FIG. 12 is a block diagram illustrating a configuration of a multi-task reinforcement learning apparatus in accordance with an exemplary embodiment of the present disclosure.

FIG. 12 illustrates a multi-task reinforcement learning apparatus in accordance with an embodiment of the present disclosure. As shown in FIG. 12, the multi-task reinforcement learning apparatus 120 includes an acquirement module 121 and a multi-task reinforcement learning module 122.

The acquirement module 121 is suitable for acquiring a data information set generated during performing of each of the multiple second tasks.

The multi-task reinforcement learning module 122 is suitable for performing multi-task reinforcement learning based on the data information set of each of the second tasks acquired by the acquirement module 121 to obtain a shared parameter set and a parameter compositional vector in the target multi-task policy model, wherein the shared parameter set includes a plurality of parameters shared by multiple second tasks, and the parameter compositional vector includes a parameter vector corresponding to each of the second tasks.

Figure 13:
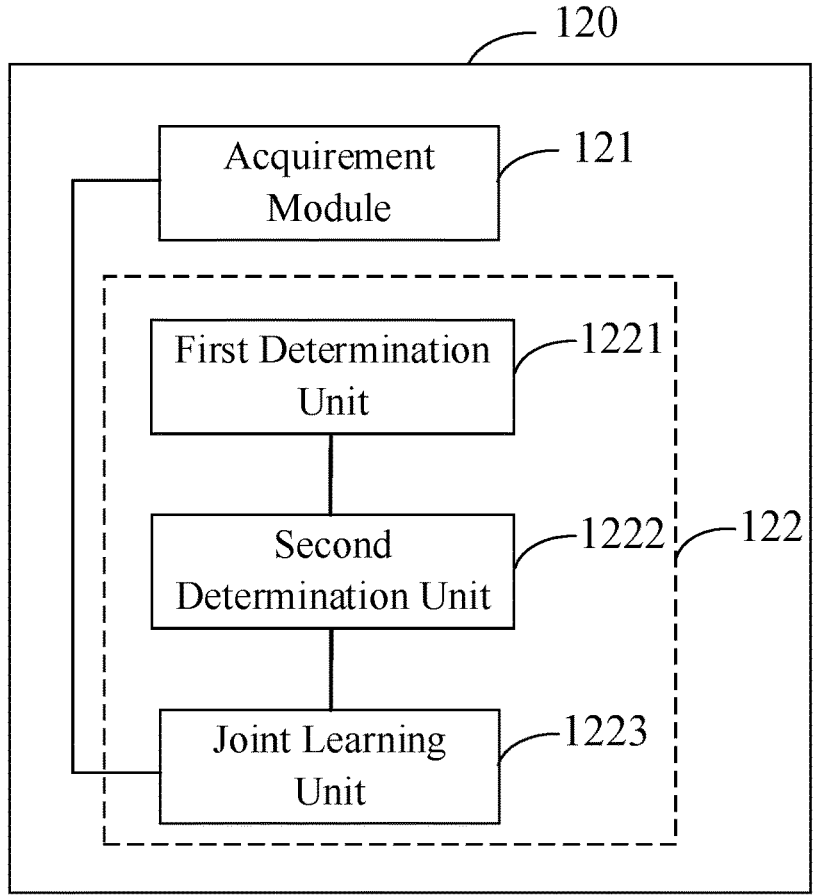
FIG. 13 is a block diagram illustrating a configuration of a multi-task reinforcement learning apparatus in accordance with another exemplary embodiment of the present disclosure.

In some embodiments, as shown in FIG. 13, the multi-task reinforcement learning module 122 includes a first determination unit 1221, a second determination unit 1222, and a joint learning unit 1223.

The first determination unit 1221 is suitable for determining the initial shared set in the initial multi-task policy model.

The second determination unit 1222 is suitable for determining initial compositional vectors based on the initial shared set determined by the first determination unit 1221 and a number of the multiple second tasks.

The joint learning unit 1223 is suitable for jointly training the initial shared set determined by the first determination unit 1221 and the initial compositional vectors determined by the second determination unit 1222 in the initial multitask policy model based on the data information set of each of the second tasks acquired by the acquirement module 121 to obtain the shared parameter set and the compositional vector of parameters in the target multitask policy model.

In some embodiments, the joint learning unit 1223 is specifically used for reading randomly, from the memory, the data information set generated during performing of the second task at each iteration in the training process; and iteratively performing the adjustment on the initial shared set and the initial compositional vectors in the initial multi-task policy model by a multi-task loss function based on the current state data, the action, the reward value and the next state data in the data information set until the cumulative reward value reaches the preset condition so as to obtain the shared parameter set and parameter compositional vector in the target multi-task policy model.

In some embodiments, the first determination unit 1221, is specifically used for determining a number of column vectors included in the initial shared set based on the number of the multiple second tasks; and generating the initial shared set based on the number of column vectors included in the initial shared set.

Exemplarily, the number of column vectors included in the initial shared set determined by the first determination unit 1221 is less than the number of the multiple second tasks.

The beneficial technical effects corresponding to the above exemplary embodiments of the multi-task reinforcement learning apparatus 120 may refer to the corresponding beneficial technical effects in the above exemplary method and will not be repeated here.

Exemplary Electronic Device

Figure 14:
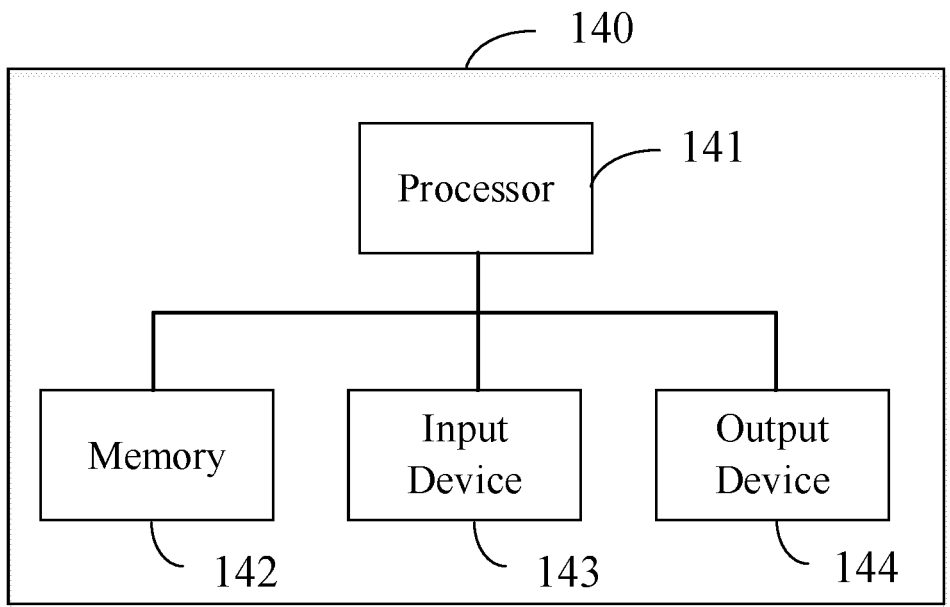
FIG. 14 is a block diagram illustrating a configuration of an electronic device in accordance with an exemplary embodiment of the present disclosure.

FIG. 14 is a block diagram illustrating a configuration of an electronic device 140 in accordance with an embodiment of the present disclosure, including at least one processor 141 and a memory 142.

The processor 141 may be a central processing unit (CPU) or another form of processing unit having a data processing capability and/or an instruction execution capability, and may control another component in the electronic device 140 to perform a desired function.

The memory 142 may include one or more computer program products. The computer program product may include various forms of computer readable storage media, such as a volatile memory and/or a non-volatile memory. The volatile memory may include, for example, a random access memory (RAM), a cache and/or the like. The non-volatile memory may include, for example, a read-only memory (ROM), a hard disk, a flash memory and the like. One or more computer program instructions may be stored on the computer readable storage medium. The program instruction may be executed by the processor 141, to implement the transfer reinforcement learning method or multi-task reinforcement learning method of the various embodiments of the present disclosure as above and/or other desired functionality.

In an example, the electronic device 140 may further include an input device 143 and an output device 144. These components are interconnected with each other through a bus system and/or another form of connection mechanism (not shown).

The input device 143 may further include, for example, a keyboard, a mouse and so on.

The output device 144 may output various information to outside, and may include, for example, a display, a loudspeaker, a printer, a communication network, a remote output device connected by the communication network, and so on.

Certainly, for simplicity, FIG. 10 shows only some of components in the electronic device 140 that are related to the present disclosure, and components such as a bus and an input/output interface are omitted. In addition, according to specific application situations, the electronic device 140 may further include any other appropriate components.

Exemplary Computer Program Product and Computer-Readable Storage Medium

In addition to the foregoing method and device, the embodiments of the present disclosure may further relate to a computer program product, including a computer program instruction that, when run by a processor, cause the processor to implement the steps in the transfer reinforcement learning method or multi-task reinforcement learning method according to the embodiments of the present disclosure, that are described in the "exemplary method" of this specification.

The computer program product may be program code, written with one or any combination of a plurality of programming languages, that is configured to perform the operations in the embodiments of the present disclosure. The programming languages include an object-oriented programming language such as Java or C++, and further include a conventional procedural programming language such as a "C" language or a similar programming language. The program code may be entirely or partially executed on a user computing device, executed as an independent software package, partially executed on the user computing device and partially executed on a remote computing device, or entirely executed on the remote computing device or a server.

In addition, the embodiments of the present disclosure may further relate to a computer-readable storage medium, which stores a computer program instruction. When executing the computer program instruction that, when run by a processor, cause the processor to perform the steps in the transfer reinforcement learning method or multi-task reinforcement learning method according to the embodiments of the present disclosure, that are described in the "exemplary method" part of this specification.

The computer-readable storage medium may be one readable medium or any combination of a plurality of readable media. The readable medium may be a readable signal medium or a readable storage medium. The readable storage medium may include, for example, but is not limited to electricity, magnetism, light, electromagnetism, infrared ray, or a semiconductor system, apparatus or device, or any combination of the above. More specific examples (a non-exhaustive list) of the readable storage medium include: an electrical connection with one or more conducting wires, a portable disk, a hard disk, a random access memory (RAM), a read-only memory (ROM), an erasable programmable read-only memory (EPROM or flash memory) or a flash memory, an optical fiber, a portable compact disk read-only memory (CD-ROM), an optical storage device, a magnetic storage device, or any suitable combination of the above.

Basic principles of the present disclosure are described above in combination with the specific embodiments. However, it should be pointed out that the advantages, superiorities, and effects mentioned in the present disclosure are merely illustrative but are not for limitation, and it cannot be considered that these advantages, superiorities, and effects are necessary for each embodiment of the present disclosure. In addition, specific details of the above disclosure are merely for examples and for ease of understanding, rather than limitations. The foregoing details do not limit that the present disclosure must be implemented by using the foregoing specific details.

The foregoing description about the disclosed aspects is provided, so that the present disclosure can be arrived at or carried out by any person skilled in the art. Various modifications to these aspects are very obvious to a person skilled in the art. Moreover, general principles defined herein may be applicable to other aspects without departing from the scope of the present disclosure. Therefore, the present disclosure is not intended to be limited to the aspect illustrated herein, but to the widest scope consistent with the principles and novel features disclosed herein.

A person skilled in the art may make various changes and variations to the present disclosure without departing from the spirit and scope of the present application. It should be noted that the scope of the present disclosure is defined by the accompanying claims, rather than by the foregoing detailed descriptions, and all changes or modifications derived from the meaning and scope of the claims and equivalents thereof are included in the scope of the present disclosure.

What is claimed is:

1. An agent-implemented transfer reinforcement learning method including:

determining operational instructions for instructing an agent to perform a first task;

determining an inclusion relation between multiple second tasks and the first tasks based on the operational instructions, wherein the multiple second tasks are previously learned tasks;

determining, in response to the inclusion relation indicating that the multiple second tasks do not include the first task, a shared parameter set corresponding to the multiple second tasks based on the inclusion relation between the multiple second tasks and the first task, wherein the shared parameter set includes a plurality of parameters shared by the multiple second tasks; and performing transfer reinforcement learning based on the shared parameter set and the first task to obtain model parameters of a target policy model corresponding to the first task, wherein the performing transfer reinforcement learning based on the shared parameter set and the first task to obtain the model parameters of the target policy model corresponding to the first task includes:

determining an initial parameter set corresponding to the first task;

generating an initial policy model corresponding to the first task based on the shared parameter set and the initial parameter set; and performing model training on the initial policy model through interacting with an environment by the agent performing an action based on the first task to obtain the model parameters of the target policy model.

2. The method according to claim 1, wherein the performing model training on the initial policy model through interacting with the environment by the agent performing the action based on the first task to obtain the model parameters of the target policy model includes:

reading randomly, from a memory, a data information set generated during performing of the first task at each iteration in a process of the training; and iteratively performing an adjustment on the model parameters of the initial policy model based on current state data, the action, a reward value and next state data in the data information set by a loss function until a cumulative reward value reaches a preset condition so as to obtain the model parameters of the target policy model.

3. The method according to claim 2, wherein the iteratively performing the adjustment on the model parameters of the initial policy model based on the current state data, the action, the reward value and the next state data in the data information set by the loss function until the cumulative reward value reaches the preset condition so as to obtain the model parameters of the target policy model includes:

iteratively performing the adjustment on an initial parameter set in the initial policy model based on the current state data, the action, the reward value, and the next state data in the data information set by the loss function until the cumulative reward value reaches the preset condition so as to obtain the model parameters of the target policy model.

4. The method according to claim 2, wherein the iteratively performing the adjustment on the model parameters of the initial policy model based on the current state data, the action, the reward value and the next state data in the data information set by the loss function until the cumulative reward value reaches the preset condition so as to obtain the model parameters of the target policy model includes:

iteratively performing the adjustment on the initial parameter set and the shared parameter set in the initial policy model based on the current state data, the action, the reward value and the next state data in the data information set by the loss function until the cumulative reward value reaches a preset condition so as to obtain the model parameters of the target policy model.

5. An agent-implemented multi-task reinforcement learning method, including:

acquiring a data information set generated during performing of each of multiple second tasks, wherein the data information set is collected via sensors through interacting with an environment by an agent; and performing multi-task reinforcement learning based on the data information set of each of the second tasks to obtain a shared parameter set and parameter compositional vectors in a target multi-task policy model, wherein the shared parameter set includes a plurality of parameters shared by the multiple second tasks, and the parameter compositional vectors includes parameter vectors corresponding to the respective second tasks, wherein the performing multi-task reinforcement learning based on the data information set of each of the second tasks to obtain the shared parameter set and the parameter compositional vectors in the target multi-task policy model includes:

determining an initial shared set in an initial multi-task policy model;

determining initial compositional vectors based on the initial shared set and a number of the multiple second tasks; and jointly training the initial shared set and the initial compositional vectors in the initial multitask policy model based on the data information set of each of the second tasks to obtain the shared parameter set and the compositional parameter vector in the target multitask policy model, wherein the determining the initial shared set in the initial multi-task policy model includes:

determining a number of column vectors included in the initial shared set based on the number of the multiple second tasks; and generating the initial shared set based on the number of column vectors included in the initial shared set, wherein the initial shared set includes a plurality of initial shared vectors, and wherein the number of column vectors included in the initial shared set is less than the number of the multiple second tasks.

6. The method according to claim 5, wherein the jointly training the initial shared set and the initial compositional vectors in the initial multitask policy model based on the data information set of each of the second tasks to obtain the shared parameter set and the compositional parameter vector in the target multitask policy model includes:

reading randomly, from the memory, the data information set generated during performing of the second task at each iteration in a process of the training;

iteratively performing an adjustment on the initial shared set and the initial compositional vectors in the initial multi-task policy model based on current state data, an action, a reward value and next state data in the data information set by a multi-task loss function until a cumulative reward value reaches a preset condition so as to obtain the shared parameter set and the parameter compositional vector in the target multi-task policy model.

7. An electronic device, including:

a processor;

a memory configured to store a processor-executable instruction, wherein the processor is configured to read the executable instruction from the memory, and execute the instruction to implement the transfer reinforcement learning method according to claim 1.

8. The electronic device according to claim 7, wherein the performing model training on the initial policy model through interacting with the environment by the agent performing the action based on the first task to obtain the model parameters of the target policy model includes:

reading randomly, from a memory, a data information set generated during performing of the first task at each iteration in a process of the training; and iteratively performing an adjustment on the model parameters of the initial policy model based on current state data, the action, a reward value and next state data in the data information set by a loss function until a cumulative reward value reaches a preset condition so as to obtain the model parameters of the target policy model.

9. The electronic device according to claim 8, wherein the iteratively performing the adjustment on the model parameters of the initial policy model based on the current state data, the action, the reward value and the next state data in the data information set by the loss function until the cumulative reward value reaches the preset condition so as to obtain the model parameters of the target policy model includes:

iteratively performing the adjustment on an initial parameter set in the initial policy model based on the current state data, the action, the reward value, and the next state data in the data information set by the loss function until the cumulative reward value reaches the preset condition so as to obtain the model parameters of the target policy model.

10. The electronic device according to claim 8, wherein the iteratively performing the adjustment on the model parameters of the initial policy model based on the current state data, the action, the reward value and the next state data in the data information set by the loss function until the cumulative reward value reaches the preset condition so as to obtain the model parameters of the target policy model includes:

iteratively performing the adjustment on the initial parameter set and the shared parameter set in the initial policy model based on the current state data, the action, the reward value and the next state data in the data information set by the loss function until the cumulative reward value reaches a preset condition so as to obtain the model parameters of the target policy model.

\* \* \* \* \*